United States Patent
Gohr et al.

(10) Patent No.: US 12,459,245 B2
(45) Date of Patent: Nov. 4, 2025

(54) ENHANCED BAG DROP FILM AND PACKAGING USING ORIENTED HIGH-DENSITY POLYETHYLENE

(71) Applicant: Jindal Films Americas LLC, LaGrange, GA (US)

(72) Inventors: Eric T. Gohr, Sharpsburg, GA (US); Robert M. Sheppard, Peachtree City, GA (US)

(73) Assignee: JFE Innovation Center SRL, Virton (BE)

( * ) Notice: Subject to any disclaimer, the term of this patent is extended or adjusted under 35 U.S.C. 154(b) by 214 days.

(21) Appl. No.: 18/207,501

(22) Filed: Jun. 8, 2023

(65) Prior Publication Data
US 2023/0311467 A1  Oct. 5, 2023

Related U.S. Application Data

(63) Continuation of application No. PCT/US2022/040342, filed on Aug. 15, 2022.

(60) Provisional application No. 63/233,235, filed on Aug. 14, 2021.

(51) Int. Cl.
| | | |
|---|---|---|
| *B32B 27/32* | (2006.01) | |
| *B32B 27/08* | (2006.01) | |
| *B32B 27/16* | (2006.01) | |
| *B32B 27/18* | (2006.01) | |

(52) U.S. Cl.
CPC .............. *B32B 27/32* (2013.01); *B32B 27/08* (2013.01); *B32B 27/16* (2013.01); *B32B 27/18* (2013.01); *B32B 2250/05* (2013.01); *B32B 2250/242* (2013.01); *B32B 2250/40* (2013.01); *B32B 2270/00* (2013.01); *B32B 2307/412* (2013.01); *B32B 2307/518* (2013.01); *B32B 2307/54* (2013.01); *B32B 2307/581* (2013.01); *B32B 2307/7376* (2023.05); *B32B 2439/46* (2013.01); *B32B 2439/70* (2013.01)

(58) Field of Classification Search
None
See application file for complete search history.

(56) References Cited

U.S. PATENT DOCUMENTS

| | | | |
|---|---|---|---|
| 6,013,353 A * | 1/2000 | Touhsaent | B32B 38/0008 428/209 |
| 2003/0211350 A1 * | 11/2003 | Migliorini | B32B 27/32 428/500 |
| 2018/0272672 A1 * | 9/2018 | Ambroise | B32B 27/18 |
| 2021/0213719 A1 | 7/2021 | Ambroise et al. | |
| 2021/0245480 A1 | 8/2021 | Gohr et al. | |
| 2021/0252841 A1 | 8/2021 | Gohr et al. | |

OTHER PUBLICATIONS

Matos, Taina, International Search Report and Written Opinion on PCT/US22/40342, Oct. 25, 2022, USPTO as RO for WIPO, Alexandria, US.
Lyondellbasell, Safety Data Sheet, Adflex X500F, May 30, 2016 (supplied in the ISR dated Oct. 25, 2022).
Osterrieder, Erik J., Demand for ISR/WO on PCT/US22/40342, Mar. 15, 2023, Kearney, McWilliams & Davis, Houston, US.

* cited by examiner

*Primary Examiner* — John Vincent Lawler
(74) *Attorney, Agent, or Firm* — Kearney, McWilliams & Davis; Erik J. Osterrieder

(57) ABSTRACT

In one example embodiment, disclosed is a polyethylene film, which in example embodiment(s) may comprise, consists essentially or, or consists of: (A) a core layer and a first tie layer on a first side of the core layer consisting essentially of: (i) at least about 20 wt. % olefin-block copolymer; (ii) at least about 40 wt. % low-density polyethylene; and (iii) at least about 40 wt. % high-density polyethylene, wherein "consisting essentially of" and "about," among other words, are defined elsewhere in this disclosure; (B) a second tie layer on a second side of the core layer comprising, consisting essentially of, or consisting of: (i) at least about 20 wt. % low-density polyethylene; and (ii) at least about 40 wt. % high-density polyethylene; and (C) skin layer(s), be oriented in one or two directions; and contain additional layers external to the skin layer(s).

20 Claims, No Drawings

ENHANCED BAG DROP FILM AND PACKAGING USING ORIENTED HIGH-DENSITY POLYETHYLENE

REFERENCE TO RELATED APPLICATIONS

This application is a continuation application, which claims priority PCT application number PCT/US22/40342 filed Aug. 15, 2022 that claims priority to U.S. provisional patent application Ser. No. 63/233,235 filed on Aug. 14, 2021, both of which are hereby incorporated by this reference in their entireties.

FIELD

This disclosure relates to compositions of biaxially oriented, high-density, polyethylene films, including methods and uses pertaining to the same.

BACKGROUND

In the marketplace, current large bags, such as those acceptable for holding pet food or otherwise, laminate polyester (PET) to polyethylene films. However, this combination of dissimilar materials poses recyclability problems. A need, therefore, exists for recyclable films, which replace PET with polyethylene so as to create an all-polyethylene film, which in various embodiments may be used for large bags or otherwise and/or provide good bag-drop performance.

SUMMARY

In one aspect, disclosed is a polyethylene film, which in example embodiment(s) may comprise a core layer and a first tie layer on a first side of the core layer consisting essentially of: (i) at least about 20 wt. % olefin-block copolymer; (ii) at least about 40 wt. % low-density polyethylene; and (iii) at least about 40 wt. % high-density polyethylene, wherein "consisting essentially of" and "about," among other words, are defined elsewhere in this disclosure. Further, the polyethylene film may comprise a second tie layer on a second side of the core layer comprising: (i) at least about 20 wt. % low-density polyethylene; and (ii) at least about 40 wt. % high-density polyethylene. Further still, the polyethylene film may comprise skin layers and be oriented.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are now be described, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm$^3$ to 0.920 g/cm$^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

By "comprises," what is meant in this disclosure, excluding the claims, is that other elements may or may not be present. That is, "comprises" is shorthand in this disclosure and means, excluding its use in the claims, to encompass the well-established meanings for "comprises," "consists essentially of," and "consists of" in U.S. patent law. In this manner, each of the various embodiments (i.e., "comprises," "consists essentially of," and "consists of" in U.S. patent law) is presented without having to write such an explanation repeatedly in this disclosure.

By "consist essentially of," what is meant, for example, is that a particular film layer does not have any more than 1 wt % or 2 wt % or 3 wt % or 4 wt % or 5 wt % of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Core Layer

As is known to those skilled in the art, the core layer of a multilayered film is most commonly the thickest layer and provides the foundation of the multilayered structure. In some embodiments, the core layer consists essentially of linear, low-density polyethylene ("LLDPE") and is substantially free from other components. In alternate embodiments, the core may also contain lesser amounts of additional polymer(s) selected from the group consisting of propylene polymer, ethylene polymer, ethylene-propylene copolymers, ethylene-propylene-butene terpolymers, elastomers, plastomers, and combinations thereof. Although not limiting in any way, examples of suitable LLDPEs, including the additional example embodiments that vary from those example embodiments in Variations 1 and 2 shown in Tables 3 and 4, include one(s) (i.e., one or mixtures of LLDPEs) in the core layer and/or either or both tie layer(s) with: (1) a melting index of 1 to 3 g/10 min (measured at 190° C.-2.13 Kg conditions); (2) a density of 0.915 to 0.930 g/cm³; (3) a melting peak of 115 to 135° C.; (4) at least two of (1)-(3); and (5) all three of (1)-(3).

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that may be suitable for use as described herein include EMPR 120, 104, 111, 106, 112, 115, EMFR 100 and 100A, ECR-373 and ESCOREZ® 2101, 2203, 2520, 5380, 5600, 5618, 5690 (commercially available from ExxonMobil Chemical Company of Baytown, Tex.); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ C5/C9 resins, REGALITE™ and REGALREZ™ aromatic and REGALITE™ cycloaliphatic/aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.); QUINTONE™ acid modified C5 resins, C5/C9 resins, and acid modified C5/C9 resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable hydrocarbon resins may be found in U.S. Pat. No. 5,667,902, incorporated herein by reference. The preceding examples are illustrative only and by no means limiting.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt % of the core layer, but some embodiments may comprise additives in the core layer in an amount up to about 30 wt % of the core layer.

The core layer preferably has a thickness in the range of from about 5 µm to 100 µm, any range therebetween, or from about 5 µm to 50 µm, or from about 20 µm to 75 µm or 100 µm, or from 25 µm to 50 µm.

Tie Layer(s)

Tie layer(s) of a multilayered film is typically used to connect two other layers of the multilayered film structure, e.g., a core layer and a sealant layer, and is positioned intermediate these other layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, or combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 μm or therebetween, preferably from about 0.50 μm to 12 μm, or from about 3 μm to 12 μm, or from about 6 μm to 12 μm, or from about 3 μm to 6 μm, or from about 2.5 μm to 5 μm. However, in some thinner films, the tie layer thickness may be from about 0.5 μm to 4 μm, or from about 0.5 μm to 2 μm, or from about 0.5 μm to 1.5 μm.

A skin layer is optional, and, when present, is provided on the outer surface(s) surface of the tie layer(s) or core layer. Skin layer(s) may be provided to improve the film's barrier properties, processability, printability, and/or compatibility for metallization, coating, and lamination to other films or substrates. In some disclosed embodiments, at least one skin layer excludes ethylene-propylene copolymer(s) and/or ethylene-propylene terpolymer(s)—collectively ethylene-propylene copolymer(s) herein—and, instead, may or may not include low-density polyethylene, optionally, linear.

In some embodiments, the skin layer comprises at least one polymer selected from the group consisting of a polyethylene polymer or copolymer, a polypropylene polymer or copolymer, an ethylene-propylene copolymer, an ethylene-propylene-butene ("EPB") terpolymer, a propylene-butene copolymer, an ethylene-vinyl alcohol polymer, and combinations thereof. Preferably, the polyethylene polymer is LLDPE such as Exceed™ resin from ExxonMobil Chemicals or Evolue™ resin from Prime Polymer or Elite™ resin from Dow. A suitable ethylene-propylene copolymer is Fina 8573 (commercially available from Fina Oil Company of Dallas, Tex.). A suitable EPB terpolymer is Chisso 7510 and 7794 (commercially available from Chisso Corporation of Japan). For coating and printing functions, the skin layer may preferably be surface-treated. For metallizing or barrier properties, the skin layer may contain LLDPE or ethylene vinyl alcohol based polymer(s) ("EVOH"). Suitable EVOH copolymer is EVAL™ G176B or XEP 1300 (commercially available from Kuraray Company Ltd. of Japan).

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.50 μm to 3.5 μm, preferably from about 0.50 μm to 2 μm, and in many embodiments most preferably from about 0.50 μm to 1.5 μm. Also, in thinner film embodiments, the skin layer thickness may range from about 0.50 μm to 1.0 μm, or 0.50 μm to 0.75 μm.

Coating

In some embodiments, one or more coatings, such as for barrier, printing and/or processing, may be applied to outer surface(s) of the multilayered films. For instance, the coating(s) may be directly on the outer surfaces (i.e., those surfaces facing away from the core) of tie layers, on either or both sides of the core layer, or elsewhere. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings may be applied by an emulsion or solution coating technique or by co-extrusion and/or lamination.

The PVdC coatings that are suitable for use with the multilayered films are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177, incorporated herein by reference.

Known vinyl alcohol-based coatings, such as PVOH and EVOH, that are suitable for use with the multilayered films include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying the coating composition to the appropriate substrate, the outer surface(s) of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

The coating composition can be applied to the film as a water-based solution. The coating composition may be applied to the treated surface in any convenient manner, such as by gravure coating, roll coating, dipping, spraying, and the like. The excess aqueous solution can be removed by squeeze rolls, doctor knives, and the like.

Additives

Additives that may be present in one or more layers of the multilayered films, include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives may be used in effective amounts, which vary depending upon the property required. Additives such as oxygen scavenger or gas scavenger can be added in any layer.

Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is high molecular PDSM (poly dimethyl siloxane) silicone gum.

Non-migratory slip agents, used in one or more skin layers of the multilayered films, may include polymethyl methacrylate (PMMA). The non-migratory slip agent may have a mean particle size in the range of from about 0.5 μm to 8 μm, or 1 μm to 5 μm, or 2 μm to 4 μm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be coated with a wax-containing coating, for lubricity, in amounts ranging from 2 wt % to 15 wt % based on the total weight of the skin layer. Any conventional wax, such as, but not limited to Carnauba™ wax (commercially available from Michelman Corporation of Cincinnati, Ohio) that is useful in thermoplastic films is contemplated.

Orientation

The embodiments include possible uniaxial or biaxial orientation of the disclosed multilayered films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times the extruded width in the machine direction and between about four to about ten times the extruded width in the transverse direction. Typical commercial orientation processes are BOPP tenter process, blown film, and LISIM technology.

Surface Treatment

One or both of the outer surfaces of the multilayered films, and, in particular, the barrier coating layer and/or the sealant coating layer as well as the outer surface of any skin layer that is optionally primed, may be surface-treated to increase the surface energy to render the film receptive to metallization, coatings such as skins for printing/or processing, printing inks, and/or lamination. The surface treatment can be carried out according to one of the methods known in the art including corona discharge, flame, plasma, chemical treatment, or treatment by means of a polarized flame.

Metallization

Outer surface(s) (i.e., the side facing away from the core) of the multilayered films may be metallized. For example, outer surfaces of the sealant layers and/or skin layers may undergo metallization after optionally being treated. Metallization may be carried out through conventional methods, such as vacuum metallization by deposition of a metal layer such as aluminum, copper, silver, chromium, or mixtures thereof and/or achieved through use of metallic oxides.

Priming

A primer coating ("primer") may be applied to any surface of the multilayered films. In this case, the film may be first treated by one of the foregoing methods to provide increased active adhesive sites thereon and to the thus-treated film surface there may be subsequently applied a continuous coating of primer, which include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied coating composition and can be applied to the film by conventional solution coating means, for example, by roller application.

The films herein are also characterized in certain embodiments as being biaxially oriented. The films may be made by any suitable technique known in the art, such as a tenter process, double bubble process, LISIM™, or others. Further, the working conditions, temperature settings, lines speeds, etc. will vary depending on the type and the size of the equipment used. Nonetheless, described generally here is one method of making the films described throughout this disclosure. In one particular embodiment, the films are formed and biaxially oriented using the "tentered" method. In the tenter process, sheets/films of the various materials are melt-blended and coextruded, such as through a 3, 4, 5, 7-layer die head, into the desired film structure. Extruders may be used to melt-blend the molten layer materials, the melt streams then metered to the die. The extruded sheet is then cooled using air, water, or both.

Downstream of the first cooling step in this example embodiment of the tentered process, the unoriented sheet is re-heated to a temperature of from 60 to 100 or 120 or 150° C. by any suitable means, such as heated S-wrap rolls, and then passed between closely spaced differential speed rolls to achieve machine-direction orientation. It is understood by those skilled in the art that this temperature range may vary depending upon the equipment, and, in particular, upon the identity and composition of the components constituting the film. Ideally, the temperature will be below that which will melt the film, or cause it to become tacky and adhere to the equipment, but high enough to facilitate the machine-direction orientation process. Notably, such temperatures referred to herein refer to the film temperature, itself. The film temperature may be measured by using, for example, infrared spectroscopy, the source being aimed at the film as it is being processed; those skilled in the art will understand that measuring the actual film temperature may not be precise and/or fully accurate. In this case, those skilled in the art may estimate the temperature of the film by knowing the temperature of the air or roller immediately adjacent to the film that is measured by any suitable means. The heating means for the film line may be set at any appropriate level of heating, depending upon the instrument, to achieve the stated or desired film temperatures.

Subsequently, the lengthened and thinned film is cooled and passed to the tenter section of the line for TD orientation. At this point, the edges of the sheet are grasped by mechanical clips on continuous chains and pulled into a long, precisely controlled, hot-air oven for a pre-heating step. The film temperatures may range from 80 or 110 to 150 or 160° C. in the pre-heating step. Again, the temperature is ideally below that which will melt the film, but high enough to facilitate the step of transverse-direction orientation. Next, the edges of the sheet are grasped by mechanical clips on continuous chains and pulled into a long, precisely controlled, hot-air oven for transverse stretching. The tenter chains diverge a desired amount to stretch the film in the transverse direction at a temperature high enough to facilitate the step of transverse-direction orientation but low enough so as not to melt the film. After stretching to the required transverse orientation, the film is then cooled from 5 to 10 or 15 or 20 or 30 or 40° C. below the stretching temperature, and the mechanical clips are released prior to any edge trimming. Thereafter, optional corona or any other treatment may take place followed by winding.

Thus, in certain embodiments the film(s) described herein are biaxially oriented with at least a 5 or 6 or 7 or 8-fold TD orientation and at least a 2 or 3 or 4-fold MD orientation.

In various embodiments, cavitation and/or opacity-inducing agents are substantially absent, meaning that they are not present in the core in any detectable amount. Examples of cavitation and/or opacity-inducing agents includes calcium carbonate, talc, carbon black, clay, untreated silica and alumina, zinc oxide, mica, asbestos, barites, magnesium carbonate and mixtures thereof, as well as those materials made from polybutylene terephthalate, nylon-6, cyclic olefin copolymers particles, and other particles that are phase-distinct from the core layer material, and having a size that, during orientation, will create cavities in the core layer.

INDUSTRIAL APPLICABILITY

The disclosed multilayered films may be stand-alone films, laminates, or webs. Or, the multilayered films may be sealed, coated, metallized, and/or laminated to other film structures. The disclosed multilayered films may be prepared by any suitable methods comprising the steps of co-extruding a multilayered film according to the description and claims of this specification, orienting and preparing the film for intended use such as by coating, printing, slitting, or other converting methods for use in packaging (e.g., bags, wrap, etc.), labeling, etc.

For some applications, it may be desirable to laminate the multilayered films to other polymeric film or paper products for purposes, such as packaging to hold large items, and further include printing and/or metallizing thereon. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

EXPERIMENTAL

As non-limiting examples, two oriented (biaxial in these examples, but, in other examples, oriented in at least one direction, i.e., uniaxial or biaxial) polyethylene films were made, one being clear and the other being cavitated, and had the structures reported in Table 1. In other embodiments, LLDPE(s) was used instead of m-LLDPE in one or more of the skin, tie, and/or core layers.

TABLE 1

(Control 1)

| Layer | Composition | wt. % | Example Brands | Thickness (μm) | Thickness (%) |
|---|---|---|---|---|---|
| skin (L1) | EP copolymer | 92 | Total 8573 | 0.8 | 3.1 |
| | anti-block MB[1] | 8 | Schulman Polybatch ABVT-22-SC | | |
| tie (L2) | HDPE | 60 | Nova Sclair 19A | 2.0 | 8.3 |
| | mLLDPE | 20 | Dow XUS 59910.08 | | |
| | OBC[2] | 20 | Lyondellbasell Adflex X500F | | |
| core (L3) | HDPE | 90 | ExxonMobil HTA108 | 18.8 | 77.2 |
| | mLLDPE | 10 | Mitsui SP3022 | | |
| tie (L4) | HDPE | 60 | Nova Sclair 19A | 2.0 | 8.3 |
| | mLLDPE | 20 | Dow XUS 59910.08 | | |
| | OBC | 20 | Lyondellbasell Adflex X500F | | |
| skin (L5) T | EP copolymer | 66 | Total 8573 | 0.8 | 3.1 |
| | mPP elastomer | 30 | Mitsui Tafmer PN-2060 | | |
| | anti-block MB | 4 | Schulman Polybatch ABVT-22-SC | | |
| | | | treated | 24.4 | 100 |

[1]MB = masterbatch = a mixture containing the antiblock in a polypropylene-based or polyethylene-based solution (same for Tables 2-4)
[2]OBC = olefin block copolymer, which may contain ethylene polymer(s) (same for Tables 2-4)
The numbers in the third, fifth and sixth columns (same for Tables 2-4) are understood to be "at least about" so as to disclose ranges for each of these components in various embodiments within the scope of the disclosed and optionally claimed invention.

TABLE 2

(Control 2)

| Layer | Composition | w. % | Example Brands | Thickness (μm) | Thickness (%) |
|---|---|---|---|---|---|
| skin (L1) | EP copolymer | 92 | Ineos KS 407 | 1.3 | 3.1 |
|  | anti-block MB | 8 | Ampacet Seablock 4 | | |
| tie (L2) | HDPE | 60 | ExxonMobil HTA108 | 2.9 | 6.8 |
|  | OBC | 20 | Lyondellbasell Equistar Adflex X500F | | |
|  | mLLDPE | 20 | Mitsui SP3022 | | |
| core (L3) | HDPE | 85 | ExxonMobil HTA108 | 31.0 | 75.9 |
|  | mLLDPE | 10 | Mitsui SP3022 | | |
|  | HCR | 5 | A. Schulman Polybatch CPS 601 | | |
| tie (L4) | HDPE | 60 | ExxonMobil HTA108 | 3.9 | 9.3 |
|  | OBC | 20 | Lyondellbasell Equistar Adflex X500F | | |
|  | mLLDPE | 20 | Mitsui SP3022 | | |
| skin (L5) | EP copolymer | 52 | Ineos KS 407 | 2.1 | 4.9 |
|  | mPP elastomer | 30 | Mitsui Tafmer PN-2060 | | |
|  | anti-block MB | 8 | Ampacet Seablock 4 | | |
|  | treated | | | 41.2 | 100 |

Commercially available 0.5 mil or 12.7 μm polyester ("PET") was the Control 3.

Turning now to experimental films, below are example structures and compositions, which are otherwise known as Variable 1 and Variable 2 in this disclosure.

TABLE 3

(Variable 1)

| Layer | Composition | w. % | Example Brands | Thickness (μm) | Thickness (%) |
|---|---|---|---|---|---|
| skin (L1) | EP copolymer | 92 | Ineos KS 407 | 1.8 | 3.8 |
|  | anti-block MB | 8 | Ampacet Seablock 4 | | |
| tie (L2) | HDPE | 40 | ExxonMobil HTA108 | 4.2 | 8.8 |
|  | OBC | 40 | Lyondellbasell Equistar Adflex X500F | | |
|  | mLLDPE | 20 | Mitsui SP3022 | | |
| core (L3) | HDPE | 85 | ExxonMobil HTA108 | 36.1 | 76.1 |
|  | mLLDPE | 10 | Mitsui SP3022 | | |
|  | HCR | 5 | A. Schulman Polybatch CPS 601 | | |
| tie (L4) | HDPE | 40 | ExxonMobil HTA108 | 3.6 | 7.5 |
|  | OBC | 40 | Lyondellbasell Equistar Adflex X500F | | |
|  | mLLDPE | 20 | Mitsui SP3022 | | |
| skin (L5) | EP copolymer | 62 | Ineos KS 407 | 1.8 | 3.7 |
|  | mPP elastomer | 30 | Mitsui Tafmer PN-2060 | | |
|  | Anti-block MB | 8 | Ampacet Seablock 4 | | |
|  | treated | | | 47.5 | 100 |

TABLE 4

(Variable 2)

| Layer | Composition | w. % | Example Brands | Thickness (μm) | Thickness (%) |
|---|---|---|---|---|---|
|  | corona-treated | | | | |
| skin (L1) | EP copolymer | 92 | Ineos KS 407 | 0.8 | 1.6 |
|  | anti-block MB | 8 | Ampacet Seablock 4 | | |
| tie (L2) | HDPE | 40 | ExxonMobil HTA108 | 2.4 | 5.1 |
|  | mLLDPE | 40 | Mitsui SP3022 | | |
|  | OBC | 20 | Lyondellbasell Equistar Adflex X500F | | |
| core (L3) | HDPE | 50 | ExxonMobil HTA108 | 37.9 | 80.1 |
|  | mLLDPE | 50 | Mitsui SP3022 | | |

TABLE 4-continued (Variable 2)

| Layer | Composition | w. % | Example Brands | Thickness (μm) | Thickness (%) |
|---|---|---|---|---|---|
| tie (L4) | HDPE | 50 | ExxonMobil HTA108 | 3.6 | 7.6 |
|  | mLLDPE | 50 | Mitsui SP3022 |  |  |
| skin (L5) | mLLDPE | 96 | Mitsui SP3022 | 1.4 | 3.0 |
|  | anti-block MB | 4 | Constab AB06001LD |  |  |
|  |  |  |  | 46.1 | 100 |

Before turning to further discussion about two specific examples, i.e., Variables 1 and 2 of the disclosed invention in the following paragraph, it should be noted that variations of the compositions of the layers may occur as compared to those listed in Tables 3 and 4, and these variations, shown in Tables 3' and 4' are also part of the disclosed invention. Without resorting to pedantic recitation of smaller ranges for each composition in each layer, it is understood that "about 10 through about 70" in Table 3' means, for example, a range, of from about 10 through about 15, from about 15 through about 20, from about 25 through about 30, from about 30 through about 35, from about 35 through about 40, from about 40 through about 45, from about 45 through about 50, from about 50 through about 55, from about 55 through about 60, from about 60 through about 65, and from about 65 through about 70. This logic applies does not mean that the range span is always 5 wt % as that is just illustrative. It could be any range in between a stated minimum and stated maximum for each of the components in each of the layers in Tables 3' and 4'.

TABLE 3'

(Variable 1 variations)

| EP copolymer | about 90 through about 99 |
| anti-block MB | about 1 through about 10 |
| HDPE | about 10 through about 70 |
| OBC | about 20 through about 60 |
| mLLDPE | about 10 through about 30 |
| HDPE | about 75 through about 95 |
| mLLDPE | about 5 through about 20 |
| HCR | 0 through about 5 |
| HDPE | about 10 through about 70 |
| OBC | about 20 through about 60 |
| mLLDPE | about 10 through about 30 |
| EP copolymer | about 50 through about 94 |

TABLE 3'-continued (Variable 1 variations)

| mPP elastomer | about 5 through about 40 |
| anti-block MB | about 1 through about 10 |

TABLE 4'

(Variable 2 variations)

| EP copolymer | about 90 through about 99 |
| anti-block MB | about 1 through about 10 |
| HDPE | about 10 through about 80 |
| mLLDPE | about 10 through about 50 |
| OBC | about 10 through about 40 |
| HDPE | about 35 through about 95 |
| mLLDPE | about 5 through about 65 |
| HDPE | 0 through about 90 |
| mLLDPE | about 10 through about 100 |
| mLLDPE | about 90 through about 99 |
| anti-block MB | about 1 through about 10 |

To validate the improvement in physical properties and bag-drop performance, the two inventive examples embodiments, Variables 1 and 2, were compared to the three controls, i.e., Controls 1-3, in terms of puncture resistance, dart-drop resistance, and bag-drop burst resistance. All five films in Tables 5-8 were laminated to the same substrate, i.e., 5 mil LLDPE, before testing, and these are the "Laminates" in these tables. Comparative results among these controls and variables are shown in Tables 5-8. A different substrate would yield the same results qualitatively, i.e., which ones perform best and worst.

Table 5 compares the puncture and dart-drop resistance for five laminated films. As shown in this table, Variable 1 had improved performance versus control 1, and Variable 2 had improved performance versus all three controls.

TABLE 5

|  | Puncture Resistance | | | | Dart-Drop Resistance | | | |
|---|---|---|---|---|---|---|---|---|
|  | Break | % Improvement versus | | | Max. Weight | % Improvement versus | | |
| Laminate | Load | Control 1 | Control 2 | Control 3 | Passed | Control 1 | Control 2 | Control 3 |
| Control 1 | 11.0N |  |  |  | 598 g |  |  |  |
| Control 2 | 14.6N |  |  |  | 990 g |  |  |  |
| Control 3 | 13.9N |  |  |  | 958 g |  |  |  |
| Variable 1 | 12.1N | 10% | −17% | −12% | 838 g | 40% | −15% | −13% |
| Variable 2 | 15.7N | 43% | 8% | 14% | 1138 g | 90% | 15% | 19% |

Table 6 compares the bag-drop performance of the five laminations. As shown in this table, Variable 1 had improved performance versus Control 1. Variable 2 had improved performance versus Controls 1 and 2. Variable 2 also had nearly the same performance as Control 3.

TABLE 6

| Laminate | Bag Drop Height - % Good Bags | | | | | | | Max. Height with 100% Good Bags | Improvement versus | |
| --- | --- | --- | --- | --- | --- | --- | --- | --- | --- | --- |
| ft. | 3 | 4 | 5 | 6 | 7 | 8 | 9 | ft. | Control 1 % | Control 2 % |
| m | 0.9 | 1.2 | 1.5 | 1.8 | 2.1 | 2.4 | 2.7 | 3 | | |
| Control 1 | 100 | 17 | | | | | | 4 | | |
| Control 2 | 100 | 100 | 67 | 17 | | | | 5 | | |
| Control 3 | 100 | 100 | 100 | 100 | 100 | 67 | 17 | 6 | | |
| Variable 1 | 100 | 100 | 83 | 67 | 33 | | | 7 | 33 | 0 |
| Variable 2 | 100 | 100 | 100 | 100 | 83 | 100 | 50 | 8 | 100 | 50 |

Table 7 compares the tensile properties of the five laminations. As shown in this table, the Variables 1 and 2 did not compromise the tensile properties versus the controls.

TABLE 7

| Laminate | Thickness (µm) | Modulus (KSI) | | Ultimate Strength (KSI) | | Elongation (%) | |
| --- | --- | --- | --- | --- | --- | --- | --- |
| | | MD | TD | MD | TD | MD | TD |
| Control 1 | 152.4 | 64 | 85 | 4.3 | 5.1 | 111 | 19 |
| Control 2 | 168.7 | 69 | 78 | 4.7 | 7.0 | 155 | 28 |
| Control 3 | 142.2 | 84 | 102 | 4.2 | 4.6 | 89 | 82 |
| Variable 1 | 172.0 | 73 | 73 | 4.3 | 5.4 | 187 | 46 |
| Variable 2 | 168.1 | 60 | 57 | 3.8 | 5.4 | 248 | 37 |

Table 8 compares the haze using ASTM D1003 of Variables 1 and 2 versus Control 2, each of which is before lamination. As shown in this table, the variables do not increase the haze versus the same thickness as the control. This is important, for example, when reverse printing before lamination as high haze can lead to a degradation of the printed image.

TABLE 8

| Laminate | % Haze |
| --- | --- |
| Control 2 | 16.8 |
| Variable 1 | 17.4 |
| Variable 2 | 13.0 |

Current large bags in the market for items such as pet food use a lamination of PET to LLDPE. Further disclosed is that the LLDPE provide good seal strength and the combination with PET provide burst resistance when bags are dropped. However, this combination of dissimilar materials poses recyclability problems.

There is strong interest in the market to drive products into recyclable structures. The invention outlined in this disclosure solves the recyclability problem by replacing the PET film in the above lamination with a polyethylene film. This creates an all or substantially all PE structure, which may be recycled while maintaining good bag-drop performance.

The methods employed in this disclosure include those standards in Table 9.

TABLE 9

| Item | ASTM Method |
| --- | --- |
| Coefficient of Friction | D 1894 |
| Dart drop | D 1709 |
| Dimensional Stability | D 1204 |
| Gauge | E 252 and D 6988 |
| Gloss | D 2457 |
| Haze | D 1003 |
| Light transmission | D 1003 |
| Opacity | D 589; TAPPI T 425 |
| Optical Density | ANSI/NAPM IT2.19 |
| OTR | D 3985 |
| Puncture Resistance | F 1306 |
| Seal Strength | F 88 |
| Tensile Properties, Modulus, Ultimate Strength, and Elongation | D 882 |
| Wetting Tension and Contact Angle | D 5946 |
| WVTR | D 1249 |
| Yield and Unit Weight | D 4321 |
| Thermal Printing | F 1405, -44, -45 |
| Vicat Softening Temperature | D 1525 |
| Lamination Bond Strength | F 2226 |
| Density of Non-Cavitated Films | D 1505 |
| Density of Cavitated or Voided Films | D 1622 |

Below are further example embodiments of the disclosed film that are written in claim form.
1. A polyethylene film comprising (or consists essentially of or consists of):
    a core layer;
    a first tie layer on a first side of the core layer consisting essentially of: (i) at least about 20 wt. % olefin-block copolymer; (ii) at least about 40 wt. % low-density polyethylene; and (iii) at least about 40 wt. % high-density polyethylene; and
    a second tie layer on a second side of the core layer comprising: (i) at least about 20 wt. % low-density polyethylene; and (ii) at least about 40 wt. % high-density polyethylene, wherein the polyethylene film is oriented.
2. The polyethylene film of claim 1, wherein the core layer consists of at least about 50 wt. % high-density polyethylene, low-density polyethylene, and, optionally, about 5 wt. % of hydrocarbon resin and/or additives.
3. The polyethylene film of claim 2, further comprising a first skin layer on the first tie layer and a second skin layer on the second tie layer, wherein the first skin layer and the second skin layer comprise antiblock additive(s), optionally in a masterbatch solution.

What is claimed is:

1. A polyethylene film comprising:
   a core layer having a thickness from about 20 μm to about 100 μm;
   a first tie layer on a first side of the core layer consisting essentially of: (i) at least about 20 wt. % olefin-block copolymer; (ii) at least about 40 wt. % low-density polyethylene; and (iii) at least about 40 wt. % high-density polyethylene; and
   a second tie layer on a second side of the core layer comprising: (i) at least about 20 wt. % low-density polyethylene; and (ii) at least about 40 wt. % high-density polyethylene,
   wherein the first tie layer and the second tie layer each have a thickness from about 3 μm to about 12 μm;
   wherein the polyethylene film is oriented.

2. The polyethylene film of claim 1, wherein the core layer consists of at least about 50 wt. % high-density polyethylene, low-density polyethylene, and, optionally, about 5 wt. % of hydrocarbon resin and/or additives.

3. The polyethylene film of claim 2, further comprising a first skin layer on the first tie layer and a second skin layer on the second tie layer, wherein the first skin layer and the second skin layer comprise antiblock additive(s), optionally in a masterbatch solution.

4. The polyethylene film of claim 1, wherein one or both outer surfaces of the polyethylene film is/are treated.

5. The polyethylene film of claim 1, wherein thickness of the core layer is from about 20 μm to about 75 μm.

6. The polyethylene film of claim 1, wherein thickness of at least one of the first tie layer and the second tie layer is from about 3 μm to about 6 μm.

7. The polyethylene film of claim 5, wherein thickness of at least one of the first tie layer and the second tie layer is from about 3 μm to about 6 μm.

8. The polyethylene film of claim 1, wherein the olefin-block copolymer contains ethylene polymer.

9. The polyethylene film of claim 1 comprises at least two coextruded layers.

10. The polyethylene film of claim 1 is a cast or blown film.

11. The polyethylene film of claim 1, further comprising a first skin layer on the first tie layer and a second skin layer on the second tie layer, wherein the first skin layer and the second skin layer comprise antiblock additive(s), optionally in a masterbatch solution.

12. The polyethylene film of claim 11, wherein the masterbatch solution is polyethylene-based.

13. The polyethylene film of claim 11, wherein the first skin layer further comprises ethylene-propylene copolymer(s), and the second skin layer excludes ethylene-propylene copolymer(s).

14. The polyethylene film of claim 11, wherein the first skin layer further comprises ethylene-propylene copolymer(s), and the second skin layer further comprises low-density polyethylene.

15. The polyethylene film of claim 11, wherein the first skin layer and second skin further comprise ethylene-propylene copolymer(s).

16. The polyethylene film of claim 15, wherein the second skin further comprises polypropylene-based elastomer(s).

17. The polyethylene film of claim 1, wherein the second tie layer further comprises at least at least about 40 wt. % olefin-block copolymer.

18. The polyethylene film of claim 17, wherein the olefin-block copolymer contains ethylene polymer.

19. The polyethylene film of claim 11, wherein the second tie layer further comprises at least at least about 40 wt. % olefin-block copolymer.

4. The polyethylene film of claim 1, further comprising a first skin layer on the first tie layer and a second skin layer on the second tie layer, wherein the first skin layer and the second skin layer comprise antiblock additive(s), optionally in a masterbatch solution.

5. The polyethylene film of claim 4, wherein the masterbatch solution is polyethylene-based.

6. The polyethylene film of claim 1, wherein the second tie layer further comprises at least at least about 40 wt. % olefin-block copolymer.

7. The polyethylene film of claim 4, wherein the second tie layer further comprises at least at least about 40 wt. % olefin-block copolymer.

8. The polyethylene film of claim 4, wherein the first skin layer further comprises ethylene-propylene copolymer(s), and the second skin layer excludes ethylene-propylene copolymer(s).

9. The polyethylene film of claim 4, wherein the first skin layer further comprises ethylene-propylene copolymer(s), and the second skin layer further comprises low-density polyethylene.

10. The polyethylene film of claim 4, wherein the first skin layer and second skin further comprise ethylene-propylene copolymer(s).

11. The polyethylene film of claim 10, wherein the second skin further comprises polypropylene-based elastomer(s).

12. The polyethylene film of claim 1, wherein one or both outer surfaces of the polyethylene film is/are treated.

13. The polyethylene film of claim 1, wherein thickness of the core layer is about 75% to about 80% of the polyethylene film.

14. The polyethylene film of claim 1, wherein thickness of each of the first tie layer and the second tie layer is about 5% to about 10% of the polyethylene film.

15. The polyethylene film of claim 13, wherein thickness of each of the first tie layer and the second tie layer is about 5% to about 10% of the polyethylene film.

16. The polyethylene film of claim 1, wherein the olefin-block copolymer contains ethylene polymer.

17. The polyethylene film of claim 6, wherein the olefin-block copolymer contains ethylene polymer.

18. The polyethylene film of claim 7, wherein the olefin-block copolymer contains ethylene polymer.

19. The polyethylene film of claim 1 comprises at least two coextruded layers.

20. The polyethylene film of claim 1 is a cast film.

21. The polyethylene film of claim 1 is a blown film.

22. The polyethylene film of claim 1, wherein the polyethylene film is metallized.

23. The polyethylene film of claim 1, wherein the polyethylene film is coated.

24. The polyethylene film of claim 1, wherein the polyethylene film is primed.

25. The polyethylene film of claim 1, wherein the first skin layer is matte.

26. The polyethylene film of claim 1, wherein the polyethylene film is laminated to a polyethylene substrate.

While the foregoing is directed to example embodiments of the disclosed invention, the scope of the disclosed compositions, systems and methods are determined by one or more claims.

20. The polyethylene film of claim 19, wherein the olefin-block copolymer contains ethylene polymer.

\* \* \* \* \*